Jan. 4, 1949. N. H. HENDERSON Re. 23,070

CLOTHES WASHER

Original Filed April 13, 1939 2 Sheets-Sheet 1

INVENTOR.
Nelson H. Henderson

Jan. 4, 1949. N. H. HENDERSON Re. 23,070
CLOTHES WASHER
Original Filed April 13, 1939 2 Sheets-Sheet 2
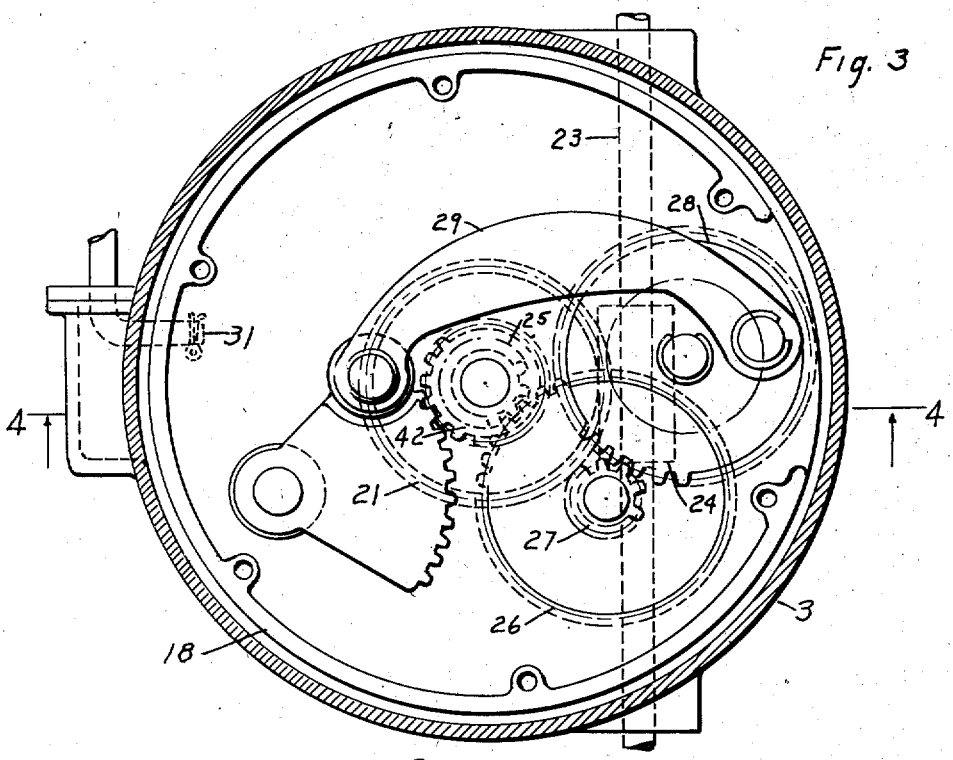
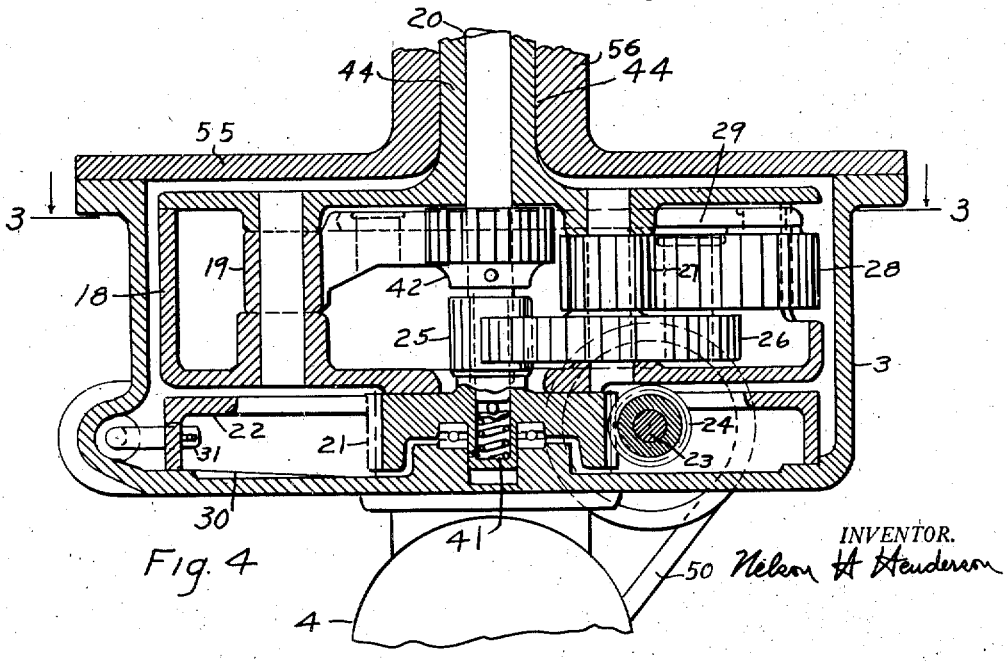
Fig. 4
INVENTOR.
Nelson H Henderson Reissued Jan. 4, 1949

Re. 23,070

UNITED STATES PATENT OFFICE 23,070

CLOTHES WASHER

Nelson H. Henderson, Syracuse, N. Y., assignor, by mesne assignments, to General Motors Corporation, Detroit, Mich., a corporation of Delaware Original No. 2,301,046, dated November 3, 1942, Serial No. 361,324, October 15, 1940, which is a division of Serial No. 267,575, April 13, 1939. Application for reissue April 20, 1944, Serial No. 531,964

16 Claims. (Cl. 68—23)

This invention relates to clothes washing machines and is a division of my pending application Serial No. 267,575 (Patent No. 2,300,421) and pertains in particular to the system of planetary gearing described therein which transmits alternately to one driven member an oscillating motion and to a second driven member a rotary motion.

When this mechanism is applied to a clothes washing machine, the oscillating member can be an agitator located concentrically within a tub and the tub itself can be the rotary member, the first acting to wash the clothes and the second to dry them by centrifugal action.

When the tub is rotated for drying the agitator takes on the same speed as the tub.

The change from one motion to the other is made to take place gradually and also the centrifugal force acting on certain parts of the planetary gear unit is used to help pick up the spinning load as the speed increases. Thus it helps the friction drive to carry the spinning load by acting as a centrifugal clutch. This feature allows the change from washing to drying conditions to be made by one operation.

The nature of this invention, together with the objects thereof, and the advantages to be derived therefrom, particularly when applied to a clothes washer, will appear in the course of the following description of a preferred embodiment which is illustrated in the drawings forming part of this specification.

Figure 3 is a section on a larger scale of the gear case as taken on line 3—3 of Figure 4 and with the cover of the inside or planetary gear case removed.

Figure 4 is a view partly in section taken on line 4—4 of Figure 3.

Figure 2:
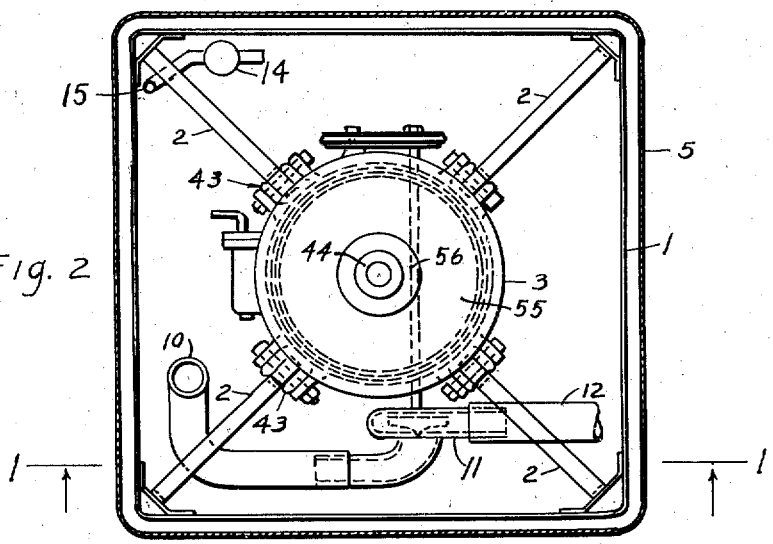
Figure 2 is a section on the line 2—2 of Figure 1 showing a top view of the gear case.
Figure 1:
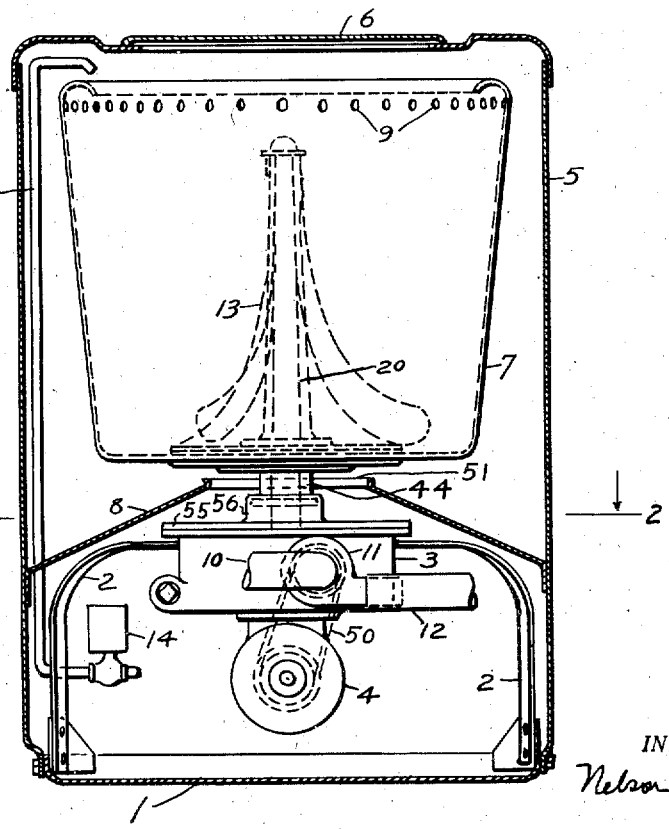
Figure 1 is a vertical section of the washing machine cabinet on line 1—1 of Figure 2 showing the inside parts in elevation.

Referring now to the drawings, the base of the machine comprises a rectangular pan 1 preferably made of sheet metal and which supports flat springs 2 which in turn support the gear case 3 from which depends a motor 4.

A rectangular cabinet 5 is also supported from the base and has a cover 6 on the top through which the clothes are placed and removed. The tub is indicated at 7.

Near the bottom and below the tub is a partition 8 having a hole 51 at the center and designed to receive overflow from the tub. The tub 7 preferably has sloping sides so that when it spins the water will rise and discharge through openings 9 against the inside of the cabinet wall from whence it falls into the pocket formed by the partition 8 and then flows into the pump inlet 10. The pump is indicated at 11.

The outlet 12 of the pump can be arranged to deliver the waste water into a sink or to some other waste connection.

The agitator 13 is similar to others well known in the art and washes in the same general way. Water can be supplied through the top opening by any means such as pipe 15.

The gear case 3 contains a train of gears and a planetary support 18 which holds part of them, together with a segment 19 which segment is arranged to impart oscillations to the center post 20 which in turn drives the agitator 13 for washing.

The cover 55 of the gear case 3 has an upstanding hub 56 which forms a bearing for the tubular shaft 44 and through which the latter is adapted to rotate and move axially.

The planetary support 18 supports the tub by means of hollow shaft 44 and is in turn supported first, while spinning, by the spiral gear 21 as shown in Fig. 4 and second, while stationary, by the brake ring 22. The shaft 23 is driven from the motor 4 through a belt 50 to operate spiral gear 24 which meshes with spiral gear 21 which in turn carries a pinion 25. The pinion 25 meshes with the idler gear 26 which carries as part of itself the pinion 27 which in turn meshes with and operates gear 28. This latter gear connects with segment 19 through the connecting rod 29. The segment 19 meshes with the pinion 42 which is fastened to the center post 20 which drives agitator 13. The brake ring 22 extends all the way around beneath the planetary support 18 and rides, in a circular path, upon three or more inclined supports 30, one only being shown, and this brake ring is actuated by some member, such as rod 31 acting to rotate it through an arc to give an axial movement and thus bring it into or out of contact with support 18. The inclined support is indicated at 30. When the brake ring 22 is in its highest position the planetary support 18 is raised and held stationary some distance away from the face of spiral gear 21 which gear retains its lowest position because of pressure of spring 41.

This is the condition of the mechanism while the washing operation is taking place. The motor operates to drive the agitator and the tub itself is stationary.

After the washing is completed the rod 31 is actuated by the operator to rotate the brake ring 22 into its lowest position allowing the planetary support 18 to bear directly upon the top surface of revolving spiral gear 21 as shown in Fig. 4. By friction the planetary support 18 now begins to revolve slowly turning hollow shaft 44 and tub 7 which, due to centrifugal force, begins to discharge the wash water through openings 9.

As the tub becomes lighter the speed increases and the connecting rod 29 together with other oscillating parts in the gear case tend, due to centrifugal action, to hold themselves in their outermost positions. As the speed increases this centrifugal force becomes greater and greater until at last the oscillations cease entirely and the agitator 13 is driven at the same speed as the tub itself which in this case is about 600 R. P. M. Near the mid point of the connecting rod 29 is shown an enlargement which is a weight that when acted upon by centrifugal force is, as the gear train and planetary gear support revolve, thrown as far as possible from the center of rotation. As the speed increases due to friction between the sun or spiral gear 21 and the planetary gear support 18 which is resting directly upon it, this centrifugal force is finally great enough to prevent these oscillating parts from returning to their innermost positions and the oscillation of the agitator 13 ceases altogether.

At this point the tub takes on the same speed as the spiral gear 21. Since the idler gear 26 cannot rotate with relation to the support 18 it becomes simply an arm attached to the gear 25 and moves about it at the same speed as the support 18.

To rinse the clothes, fresh water may be turned in while the tub is spinning; in which case the water is driven through the clothes by centrifugal action. Again the tub may be stopped and the clothes rinsed by action of the agitator.

Many uses of this device may be found beside that of washing clothes and I do not restrict the patent to the specific showing and description here made.

What I claim is:

1. Driving mechanism comprising in combination a rotary driving member, two concentric driven members, one forming an extended bearing for the other, and mechanism including an oscillatory device and means for oscillating the latter actuated by said driving member for imparting oscillations to one of said driven members, mechanism tending at all times to transmit rotary motion to the other driven member and means operable to render said last mentioned mechanism inoperative including a friction brake and to permit said first mechanism to transmit oscillations to said one of said driven members.

2. Driving mechanism of the character described consisting of a driving spiral gear mounted in a gear case adjacent a turnably mounted element, frictionally engaging parts between the turnably mounted element and the gear case, frictionally engaging parts between the spiral gear and the turnably mounted element, the first mentioned frictionally engaging part manually controlled and acting to separate the spiral gear and the second mentioned frictionally engaging part.

3. Apparatus of the character described comprising in combination, a gear case, driving means mounted in the gear case, a turnably mounted element axially movable, means for shifting the latter axially, within the gear case, a gear train within the turnably mounted element, frictional means and also positive means actuated by centrifugal force acting on parts of the gear train offset from the center of rotation of the turnable element, both said means acting together to transmit rotation to the turnably mounted element.

4. In a combined washing and extracting machine, in combination, a planetary gear mechanism including a driven spiral gear, an axially movable planetary support, a container attached to said support, an oscillatory agitator located within said container and co-axial therewith, an upright post connected to the agitator and journaled in said support coaxially with said agitator, a gear on the post, and means in mesh with the gear for selectively oscillating the post or for rotating both the agitator and container, said means depending on an axial movement of said support for preventing the container from rotating while permitting the agitator to oscillate.

5. Washing mechanism including two concentric shafts, one carrying a receptacle and the other an agitator within the receptacle, one rotary and the other oscillatory, a planetary support, driven mechanism including a gear train carried by the latter and connected with said shafts for driving the latter, braking mechanism, and means for moving the planetary support in and out of frictional engagement with one of the gears of said driven mechanism.

6. Driving mechanism including two concentric shafts, one rotary and the other oscillatory, a gear case into which one end of said shafts extends, an axially movable planetary support within the gear case and constructed and arranged to move with one of said shafts, driven mechanism including intermeshed gearing carried by the planetary support, one of the gears keyed to one of said shafts and the other gears carried by the planetary support, a spiral gear concentric with the shaft, braking mechanism for moving the planetary support in and out of engagement with the spiral gear.

7. Washing mechanism including two concentric shafts, one rotary and the other oscillatory, a planetary support, driven mechanism including a gear train carried by the latter and connected with said shafts for driving the latter, braking mechanism, means for moving the planetary support in and out of frictional engagement with one of the gears of said driven mechanism, a tub carried by the rotary shaft and an agitator located within the tub and carried by the oscillatory shaft.

8. Driving mechanism including two concentric shafts, one rotary and the other oscillatory, a gear case into which one end of said shafts extends, an axially movable planetary support within the gear case and constructed and arranged to move with one of said shafts, a spiral gear carrying a pinion, a train of gears actuated by said pinion, said train of gears housed by the planetary support, a pinion secured to one of the shafts, a segment geared to said pinion, a weighted connecting rod extending from said segment to one of the gears of the train of gears whereby to move the segment by centrifugal force, and brake means for moving the planetary support in and out of engagement with the spiral gear.

9. Driving mechanism including two concentric shafts, one rotary and the other oscillatory, a gear case into which one end of said shafts extends, an axially movable planetary support within the gear case and constructed and arranged to move with one of said shafts, a spiral gear carrying a pinion, a train of gears actuated by said pinion, said train of gears housed by the planetary support, a pinion secured to one of the shafts, a segment geared to said pinion, a weighted connecting rod extending from said segment to one of the gears of the train of gears whereby to move the segment by centrifugal force, brake means for moving the planetary support in and out of engagement with the spiral gear, said braking mechanism constituted by a brake ring rotatably supported within the casing in a position adjacent to the planetary support, and means for turning and moving the brake ring toward and away from the planetary support.

10. In a clothes washer, a rotatably mounted tub for holding washing fluid, a concentric agitator mounted therein, concentric shafts to one of which the tube is secured, the concentric agitator mounted upon the other shaft, both shafts terminating in a driven mechanism, a planetary support within which said mechanism is housed, a gear case, a circular brake ring located within the latter adjacent to the planetary support, means for transmitting axial movement to the brake ring, a driving spiral gear, frictional parts between the spiral gear and the planetary support, and means for rotating the brake ring to bring said parts into frictional contact due to the axial movement of the support.

11. In a clothes washer, a tub for holding the washing fluid, said tub rotatably mounted on a hollow shaft, a concentric agitator mounted upon a shaft, a gear-case, both shafts terminating in a driven mechanism enclosed in a planetary support, the latter being movable axially, a train of gears housed in said support, a circular brake-ring located between the bottom of the gear case and support, and means for rotating the brake-ring to produce axial movement of the support by creating frictional contact between the brake and support.

12. Driving mechanism including a gear case, two driven and a driving member, a planetary mechanism characterized by three concentrically mounted gears, one of which is secured to one of the driven members, and one of which is a spiral gear directly actuated by the driving member, a planetary support for the planetary mechanism, transmission gears located therein, deriving their motion from one of the concentric gears, an oscillatory segment mounted on the support and having teeth meshed with the gear on one of the driven members, a connecting means extending from the segment to a crank-pin on one of the transmission gears, and a brake in position to move the planetary support into or out of frictional contact with the spiral gear.

13. Driving mechanism including a gear case, a planetary gear support rotatable and axially movable therein, a tubular shaft extending from the support through a bearing in the top of the gear case, a center post extending through the tubular shaft, a gear secured to said center post, a driving gear, a spiral gear driven thereby, a chain of transmission gears actuated by the spiral gear, means including a toothed segment mounted to oscillate on the gear support with its teeth geared to the gear on the center post, means connecting the segment to one of the transmission gears, and braking means for moving the planetary gear support with its tubular shaft into and out of frictional contact with the spiral gear, whereby to drive or stop the rotation of the tubular shaft.

14. Driving mechanism comprising in combination a rotary driving member, two concentric driven members, the outer driven member forming an extended bearing for the inner driven member and being directly connected to a tub, the inner driven member being directly connected to an agitator within said tub and mechanism including an oscillatory device and means for oscillating the inner driven member actuated by said driving member for imparting oscillations to the inner driven member, mechanism tending at all times to transmit rotary motion to the outer driven member and means operable to render said last mentioned mechanism inoperative including a friction brake and to permit said first mechanism to transmit oscillations to said inner driven member.

15. Driving mechanism comprising in combination a rotary driving member, two concentric driven members, one forming an extended bearing for the other and being directly connected to a tub, the other being directly connected to an agitator within said tub, and mechanism including an oscillatory device and means for oscillating the latter actuated by said driving member for imparting oscillations to one of said driven members, mechanism tending at all times to transmit rotary motion to the other driven member, said last mentioned mechanism including a rotatable cage eccentrically carrying said oscillatory device, and means operable to render said last mentioned mechanism inoperative including a friction brake and to permit said first mechanism to transmit oscillations to said one of said driven members.

16. Washing mechanism including a receptacle rotatable on a vertical axis, a vertical tubular drive shaft fixed thereto, an oscillatable agitator in said receptacle, an agitator drive shaft within the tubular drive shaft and fixed to said agitator, a rotatable frame fixed to said tubular drive shaft, a power driving member cooperating with said frame, a crank for oscillating said agitator drive shaft journaled in the frame, a driving gear connected to said crank journaled in said frame and driven by relative rotation of said driving member with respect to said frame, and means selectively holding the frame stationary or drivingly connecting said frame to said driving member.

NELSON H. HENDERSON.

REFERENCES CITED

The following references are of record in the file of this patent:

UNITED STATES PATENTS

| Number | Name | Date |
|---|---|---|
| 1,911,630 | Lenning | May 30, 1933 |
| 1,991,793 | Cureton | Feb. 19, 1935 |
| 2,109,620 | Kirby | Mar. 1, 1938 |
| 2,161,604 | Watts | June 6, 1939 |
| 2,222,329 | Watts | Nov. 19, 1940 |
| 2,267,786 | Chayle | Dec. 30, 1941 |

FOREIGN PATENTS

| Number | Country | Date |
|---|---|---|
| 532,174 | Germany | 1931 |